(12) United States Patent
Park et al.

(10) Patent No.: US 9,277,516 B2
(45) Date of Patent: Mar. 1, 2016

(54) APPARATUS AND METHOD FOR GENERATING SYNCHRONIZATION CHANNEL IN A WIRELESS COMMUNICATION SYSTEM

(71) Applicant: Samsung Electronics Co., Ltd, Gyeonggi-do (KR)

(72) Inventors: Sung-Eun Park, Seoul (KR); Jae-Weon Cho, Seongnam-si (KR); Seung-Hoon Choi, Suwon-Si (KR); Chi-Woo Lim, Suwon-si (KR); Song-Nam Hong, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 202 days.

(21) Appl. No.: 14/042,460

(22) Filed: Sep. 30, 2013

(65) Prior Publication Data

US 2014/0029590 A1 Jan. 30, 2014

Related U.S. Application Data

(63) Continuation of application No. 12/655,705, filed on Jan. 6, 2010, now Pat. No. 8,548,074.

(30) Foreign Application Priority Data

Mar. 31, 2009 (KR) ........................ 10-2009-0027432

(51) Int. Cl.
*H04J 3/00* (2006.01)
*H04W 56/00* (2009.01)
(Continued)

(52) U.S. Cl.
CPC ......... *H04W 56/0015* (2013.01); *H04L 5/0007* (2013.01); *H04L 5/0053* (2013.01);
(Continued)

(58) Field of Classification Search
CPC ............ H04W 74/006; H04W 74/008; H04W 74/0833; H04W 74/0841; H04W 56/001; H04W 56/0015; H04W 56/002; H04W 56/0025
USPC ................. 375/146–149, 219–220, 260–264, 375/302–308, 316, 329–336; 370/35–338, 370/342–344; 455/59, 91
See application file for complete search history.

(56) References Cited

U.S. PATENT DOCUMENTS 8,009,663 B2 * 8/2011 Yamada et al. ............... 370/350
2001/0048711 A1 12/2001 Sun et al.
(Continued)

FOREIGN PATENT DOCUMENTS

CN 1604509 A 4/2005
CN 1879321 A 12/2006
(Continued)

OTHER PUBLICATIONS

Chinese Patent Certificate No. 1465189 dated Aug. 20, 2014; 3 pages.
(Continued)

*Primary Examiner* — Thai Hoang

(57) ABSTRACT

A Synchronization Channel (SCH) transmission method includes generating a Primary SCH (P-SCH) sequence according to supplementary information. The supplementary information includes at least one of Base Station (BS) type information, Fast Fourier Transform (FFT) size information, BandWidth (BW) information, group information, sector information, and carrier type information. The method also includes modulating the P-SCH sequence and mapping the modulated P-SCH sequence to subcarriers within a predefined subcarrier set. The subcarriers are included in the subcarrier set being spaced one subcarrier interval apart. The method further includes generating a P-SCH symbol by Orthogonal Frequency Division Multiplexing (OFDM)-modulating the P-SCH sequence mapped to the subcarriers, and transmitting the P-SCH symbol.

22 Claims, 9 Drawing Sheets

(51) Int. Cl.
*H04L 5/00* (2006.01)
*H04L 27/26* (2006.01)

(52) U.S. Cl.
CPC ........ *H04L27/2613* (2013.01); *H04L 27/2626* (2013.01); *H04L 27/2655* (2013.01); *H04L 27/2614* (2013.01)

(56) References Cited

U.S. PATENT DOCUMENTS

| | | | |
|---|---|---|---|
| 2003/0208714 A1 | 11/2003 | Kahlman | |
| 2005/0111522 A1* | 5/2005 | Sung et al. | 375/145 |
| 2005/0243940 A1* | 11/2005 | Huh et al. | 375/260 |
| 2005/0281316 A1 | 12/2005 | Jang et al. | |
| 2006/0045003 A1 | 3/2006 | Choi et al. | |
| 2007/0133386 A1 | 6/2007 | Kim et al. | |
| 2007/0140106 A1 | 6/2007 | Tsai et al. | |
| 2008/0039013 A1 | 2/2008 | Chang et al. | |
| 2008/0095254 A1* | 4/2008 | Muharemovic et al. | 375/260 |
| 2008/0240285 A1* | 10/2008 | Han et al. | 375/295 |
| 2008/0273582 A1 | 11/2008 | Gaal et al. | |
| 2008/0316961 A1* | 12/2008 | Bertrand et al. | 370/329 |
| 2009/0041105 A1 | 2/2009 | Okazaki | |
| 2009/0109919 A1* | 4/2009 | Bertrand et al. | 370/330 |
| 2009/0185550 A1 | 7/2009 | Naka et al. | |
| 2009/0196163 A1* | 8/2009 | Du | 370/204 |
| 2010/0157927 A1 | 6/2010 | Mochizuki et al. | |
| 2011/0110437 A1* | 5/2011 | Kim | 375/259 |
| 2011/0158123 A1 | 6/2011 | Kim et al. | |
| 2012/0121040 A1* | 5/2012 | Yu et al. | 375/296 |

FOREIGN PATENT DOCUMENTS

| | | |
|---|---|---|
| CN | 101286787 A | 10/2008 |
| EP | 1528704 A2 | 5/2005 |
| EP | 2082501 A1 | 7/2009 |
| JP | 2006014321 A | 1/2006 |
| JP | 2008503979 A | 2/2008 |
| RU | 2348109 C2 | 2/2009 |
| WO | WO2004/114548 A1 | 12/2004 |
| WO | WO2005/088870 A1 | 9/2005 |
| WO | WO2005/107121 A1 | 11/2005 |
| WO | WO 2005/107121 A1 | 11/2005 |
| WO | WO 2007/088580 A1 | 8/2007 |
| WO | WO 2007088580 A1 | 8/2007 |
| WO | WO2007088580 A1 | 8/2007 |
| WO | WO 2007/138666 A1 | 12/2007 |
| WO | WO 2007138666 A1 | 12/2007 |
| WO | WO 2009/001594 A1 | 12/2008 |
| WO | WO2009001594 A1 | 12/2008 |
| WO | WO 2009001594 A1 | 12/2008 |
| WO | WO 2009/075898 A1 | 6/2009 |

OTHER PUBLICATIONS

Translated Russian Office Action dated Nov. 22, 2013 in connection with Russian Application No. 2011127541/07(040816); 8 pages.
Translated Taiwanese Office Action dated Jan. 14, 2014 in connection with Taiwanese Application No. 2011-544381; 5 pages.
Translated Japanese Office Action dated Jan. 10, 2014 in connection with Japanese Application No. 098145630; 11 pages.
Extended European Search Report dated Feb. 10, 2014 in connection with European Application No. 10150178.1; 8 pages.
Liao, et al.;"A New Preamble Structure for Robust Timing/Frequency Synchronization in IEEE 802.16m System" <http://ieee802.org/16>; IEEE 802.16 Broadband Wireless Access Working Group; Jul. 9, 2008; 5 pages.
Translated Japanese Decision of Rejection in connection with Japanese Application No. 2011-544381 dated May 27, 2014, 7 pages.
Translated Saudi Arabian Office Action dated Jun. 24, 2014, 4 pages.
Translated Russian Decision to Grant in connection with Russian Application No. 2011127541/07 (040816) dated Jun. 23, 2014, 26 pages.
Written Opinion of the International Searching Authority dated Aug. 31, 2010 in connection with International Patent Application No. PCT/KR2010/000071.
International Search Report dated Aug. 31, 2010 in connection with International Patent Application No. PCT/KR2010/000071.
Translated Text of First Office Action of the Chinese Patent Application dated Jun. 7, 2013 in connection with Chinese Patent Application No. 201080003970.7; 11 pages.
Notice of Patent Grant dated Nov. 4, 2014 in connection with Japanese Patent Application No. 2011-544381; 5 pages.
Notice of Preliminary Rejection dated Apr. 20, 2015 in connection with Korean Patent Application No. 10-2009-0027432; 13 pages.
NEC Group; "Primary Synchronization Codes (PSC) for E-UTRA"; 3GPP TSG RAN WG1 #47bis; R1-070358; Sorrento, Italy; Jan. 15-19, 2007; 8 pages.
Tsai, et al., "Cell Sarch in 3GPP Long Term Evolution Systems"; IEEE Vehicular Tech Magazine; Jun. 2007; 7 pages.
Translated Final Rejection dated Oct. 13, 2015 in connection with Korean Patent Application No. 10-2009-0027432; 6 pages.
Notice of Patent Grant dated Jan. 5, 2016 in connection with Korean Patent Application No. 10-2009-0027432; 8 pages.

* cited by examiner

| CP | B | B |

FIG.5

| CP | B | −B |

FIG.6

APPARATUS AND METHOD FOR GENERATING SYNCHRONIZATION CHANNEL IN A WIRELESS COMMUNICATION SYSTEM

CROSS-REFERENCE TO RELATED APPLICATION(S) AND CLAIM OF PRIORITY

The present application is a continuation of, and incorporates by reference, U.S. patent application Ser. No. 12/655,705 filed Jan. 6, 2010, now U.S. Pat. No. 8,548,074, and claims priority to Korean Patent Application Serial No. 10-2009-0000927 filed Jan. 6, 2009, and Korean Patent Application Serial No. 10-2009-0027432 filed Mar. 31, 2009.

TECHNICAL FIELD OF THE INVENTION

The present invention relates to an apparatus and method for communicating a Synchronization Channel (SCH) in a wireless communication system. More particularly, the present invention relates to an apparatus and method for generating a Primary SCH (P-SCH) for timing synchronization in a wireless communication system.

BACKGROUND OF THE INVENTION

Today, for the sake of high speed mobile communication, many wireless communication technologies have been proposed as candidates. Among these, an Orthogonal Frequency Division Multiplexing (OFDM) technique is now recognized as the most leading next-generation wireless communication technology. In the future, it is expected that the OFDM technology will be used in most of the wireless communication technologies. At present, even Institute of Electrical and Electronics Engineers (IEEE) 802.16 Wireless Metropolitan Area Network (WMAN) that is called 3.5-Generation (3.5G) technology adopts the OFDM technology as standards.

The OFDM scheme is a scheme of transmitting data using a multi-carrier. Namely, the OFDM scheme is a type of Multi Carrier Modulation (MCM) scheme of parallel converting symbol streams input in series and modulating each of the symbol streams into a plurality of sub-carriers having cross orthogonality, i.e., a plurality of sub-channels for transmission.

In a broadband wireless communication system using the OFDM scheme, a Base Station (BS) transmits a Synchronization Channel (SCH) to a Mobile Station (MS) for the sake of timing synchronization and BS distinguishment. Namely, the MS can distinguish the BS to which it belongs using the SCH. A position where the SCH is transmitted is predefined between a transmit end and a receive end. As a result, the SCH operates as a kind of reference signal.

The SCH can be designed in various methods. Among them, the most noticed method is currently a method of loading and transmitting a Pseudo-Random (PR) sequence native to a BS on subcarriers at predetermined intervals at a frequency domain. In the case of mapping a sequence at predetermined intervals without loading and transmitting a sequence on all subcarriers, regarding a time domain signal after an Inverse Fast Fourier Transform (IFFT) operation, it can be identified that a repetition of a constant pattern takes place within an OFDM symbol. Here, the repetition count is varied depending on the sequence mapping interval of the frequency domain.

An SCH used in a conventional IEEE 802.16e system is described below.

FIG. 1 illustrates an SCH of a conventional system at a frequency domain. As illustrated in FIG. 1, in the conventional SCH, a sequence value is allocated every three-subcarrier intervals at the frequency domain.

A time domain signal of an SCH corresponding to that of FIG. 1 is illustrated in FIG. 2. Referring to FIG. 2, the conventional SCH has a format in which the same signal is repeated 3 times at a time domain. An MS acquires timing synchronization using a repetition pattern of the SCH. At this time, a size of IFFT is equal to the power of '2'; however, the '3' (repetition count) is not equal to a divisor of the IFFT size and therefore, the three-time repetition pattern is not a complete repetition pattern but an incomplete repetition pattern. Accordingly, in case that the MS is positioned at a cell boundary or cell edge of a BS, there may occur a problem that, because an SCH of an adjacent cell acts as interference, the three-time repetition pattern is broken. In this case, the MS has difficulty acquiring timing synchronization.

Additionally, the conventional SCH uses a sequence of the same length as that of the number of subcarriers allocated to one SCH. A conventional IEEE 802.16e system uses 114 sequences to distinguish the total 114 BSs. For example when a length of IFFT is equal to '1024', a length of each sequence is equal to '284' that is the number of subcarriers allocated to an SCH. At this time, an MS determines correlation values between a received SCH signal and the 114 sequences previously possessed, and acquires a cell IDentification (ID).

An IEEE 802.16m system, a system evolving from the conventional IEEE 802.16e system, requires more cell IDs than the IEEE 802.16e system. Also, even the number of sequences of an SCH symbol (i.e., an OFDM symbol) is increased in proportion to the number of cell IDs. The increase of the number of sequences may result in a deterioration of a correlation characteristic between sequences and a degradation of cell ID detection performance and also, an increase of a Peak to Average Power Ratio (PAPR) of the sequence and a decrease of a margin capable of boosting a transmit power of an SCH.

Also, the IEEE 802.16m system can require that an SCH include supplementary information (i.e., a system parameter) other than cell ID information. As such, an SCH of a future system (e.g., IEEE 802.16m) should be newly designed to meet additional requirements of many cell IDs and supplementary information transmission, and so forth. At this time, it is required to optimally design sequences of the SCH in consideration of cross correlation characteristics and PAPRs.

SUMMARY OF THE INVENTION

To address the above-discussed deficiencies of the prior art, it is a primary aspect of the present invention to provide an apparatus and method for generating a Synchronization Channel (SCH) of improved timing synchronization performance in a broadband wireless communication system.

Another aspect of the present invention is to provide an apparatus and method for generating an SCH in which a time domain signal includes a two-time repetition pattern in a broadband wireless communication system.

A further aspect of the present invention is to provide an apparatus and method for generating an SCH using a sequence according to supplementary information in a broadband wireless communication system.

Yet another aspect of the present invention is to provide an apparatus and method for generating an SCH for transmitting supplementary information in a broadband wireless communication system.

Yet still another aspect of the present invention is to provide an apparatus and method for generating an SCH of a low Peak to Average Power Ratio (PAPR) in a broadband wireless communication system.

The above aspects are achieved by providing an apparatus and method for generating an SCH in a wireless communication system.

According to one aspect of the present invention, an apparatus for transmitting a Primary Synchronization Channel (P-SCH) in a wireless communication system providing at least two different SCHs is provided. The apparatus includes a sequence generator, a modulator, a subcarrier mapper, an Orthogonal Frequency Division Multiplexing (OFDM) modulator, and a transmitter. The sequence generator generates a P-SCH sequence according to supplementary information. The supplementary information includes at least one of Base Station (BS) type information, Fast Fourier Transform (FFT) size information, BandWidth (BW) information, group information, sector information, and carrier type information. The modulator modulates the P-SCH sequence. The subcarrier mapper maps the modulated P-SCH sequence to subcarriers within a predefined subcarrier set. The subcarriers included in the subcarrier set are spaced one subcarrier interval apart. The OFDM modulator generates a P-SCH symbol by OFDM-modulating the P-SCH sequence mapped to the subcarriers. The transmitter transmits the P-SCH symbol.

According to another aspect of the present invention, an apparatus for receiving a P-SCH in a wireless communication system providing at least two different SCHs is provided. The apparatus includes a receiver, a timing synchronization acquisition unit, an OFDM demodulator, a subcarrier extractor, a demodulator, and a sequence demodulator. The receiver converts a reception signal into baseband sample data. The timing synchronization acquisition unit acquires timing synchronization from the sample data using a time-domain repetition pattern of the P-SCH. The OFDM demodulator OFDM-demodulates reception sample data on the basis of the timing synchronization and generates frequency domain data. The subcarrier extractor extracts signals from subcarriers within a predefined subcarrier set among the frequency domain data. The subcarriers included in the subcarrier set are spaced one subcarrier interval apart. The demodulator demodulates the extracted signal of the subcarrier set and detects a P-SCH sequence. The sequence demodulator correlation-operates with candidate sequences that are included in a table storing candidates for the P-SCH sequence, detects the P-SCH sequence by determining a candidate sequence having the maximum correlation value, and acquires supplementary information corresponding to the P-SCH sequence. The supplementary information includes at least one of BS type information, FFT size information, BW information, group information, sector information, and carrier type information.

According to a further aspect of the present invention, a method for transmitting a P-SCH in a wireless communication system providing at least two different SCHs is provided. The method includes generating a P-SCH sequence according to supplementary information, the supplementary information including at least one of BS type information, EFT size information, BW information, group information, sector information, and carrier type information, modulating the P-SCH sequence, mapping the modulated P-SCH sequence to subcarriers within a predefined subcarrier set, the subcarriers included in the subcarrier set being spaced one subcarrier interval apart, generating a P-SCH symbol by OFDM-modulating the P-SCH sequence mapped to the subcarriers, and transmitting the P-SCH symbol.

According to a yet another aspect of the present invention, a method for receiving a P-SCH in a wireless communication system providing at least two different SCHs is provided. The method includes converting a reception signal into baseband sample data, acquiring timing synchronization from the sample data using a time-domain repetition pattern of the P-SCH, OFDM-demodulating reception sample data on the basis of the timing synchronization and generating frequency domain data, extracting signals from subcarriers within a predefined subcarrier set among the frequency domain data, the subcarriers included in the subcarrier set being spaced one subcarrier interval apart, demodulating the extracted signal of the subcarrier set and detecting a P-SCH sequence, correlation-operating with candidate sequences that are included in a table storing candidates for the P-SCH sequence, detecting the P-SCH sequence by determining a candidate sequence having the maximum correlation value, and acquiring supplementary information corresponding to the P-SCH sequence. The supplementary information includes at least one of BS type information, FFT size information, BW information, group information, sector information, and carrier type information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates a time domain signal of a P-SCH according to an exemplary embodiment of the present invention;

FIG. 6 illustrates a time domain signal of a P-SCH according to an exemplary embodiment of the present invention;

DETAILED DESCRIPTION OF THE INVENTION

FIGS. 3 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

A technology for communicating a Synchronization Channel (SCH) for timing synchronization and supplementary information transmission in a broadband wireless communication system based on Orthogonal Frequency Division Multiplexing (OFDM)/Orthogonal Frequency Division Multiple Access (OFDMA) according to an exemplary embodiment of the present invention is described below.

An Institute of Electrical and Electronics Engineers (IEEE) 802.16m system is, for example, described below, but an exemplary embodiment of the present invention is easily applicable even to wireless communication systems of other standards making use of an SCH.

As described earlier, a future system (e.g., IEEE 802.16m) has to design a new SCH to meet additional requirements of many cell IDentifications (IDs), supplementary information transmission, and the like.

The future system can include a plurality of SCHs to meet a diversity of requirements. For example, the future system can include two different SCHs: a Primary SCH (P-SCH) and a Secondary SCH (S-SCH). A Primary Advanced (PA) preamble can denote a synchronization signal transmitted through the P-SCH, and a Secondary Advanced (SA) preamble can denote a synchronization signal transmitted through the S-SCH. The P-SCH and the S-SCH can divide and support functions required. Namely, functions that the P-SCH and the S-SCH have to conduct should be newly defined. Also, sequences of each of the P-SCH and the S-SCH, a subcarrier mapping method, and the like should be defined.

A structure of the IEEE 802.16m system and a function of the P-SCH are described below.

Figures 1, 2:
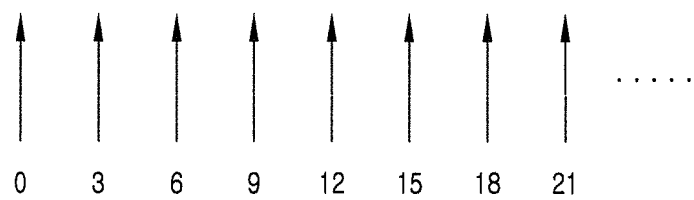
FIG. 1 illustrates a frequency domain signal of a Synchronization Channel (SCH) according to the conventional art.
FIG. 2 illustrates a time domain signal of an SCH according to the conventional art.
Figure 3:
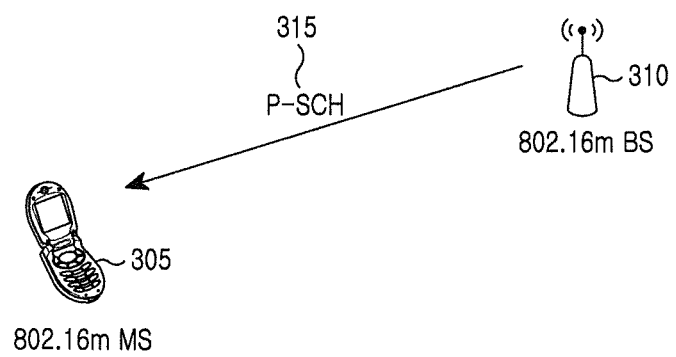
FIG. 3 illustrates an Institute of Electrical and Electronics Engineers (IEEE) 802.16m system according to an exemplary embodiment of the present invention.

FIG. 3 illustrates an IEEE 802.16m system according to an exemplary embodiment of the present invention.

As illustrated in FIG. 3, in order for an IEEE 802.16m Mobile Station (MS) 305 and an IEEE 802.16m Base Station (BS) 310 to perform communication, the IEEE 802.16m MS 305 acquires synchronization using a signal received from the IEEE 802.16m BS 310 through a P-SCH 315. At this time, the P-SCH 315 provides functions of timing synchronization, frequency synchronization, and supplementary information transmission. Here, the timing synchronization can include frame synchronization, super-frame synchronization, etc.

Figure 4:
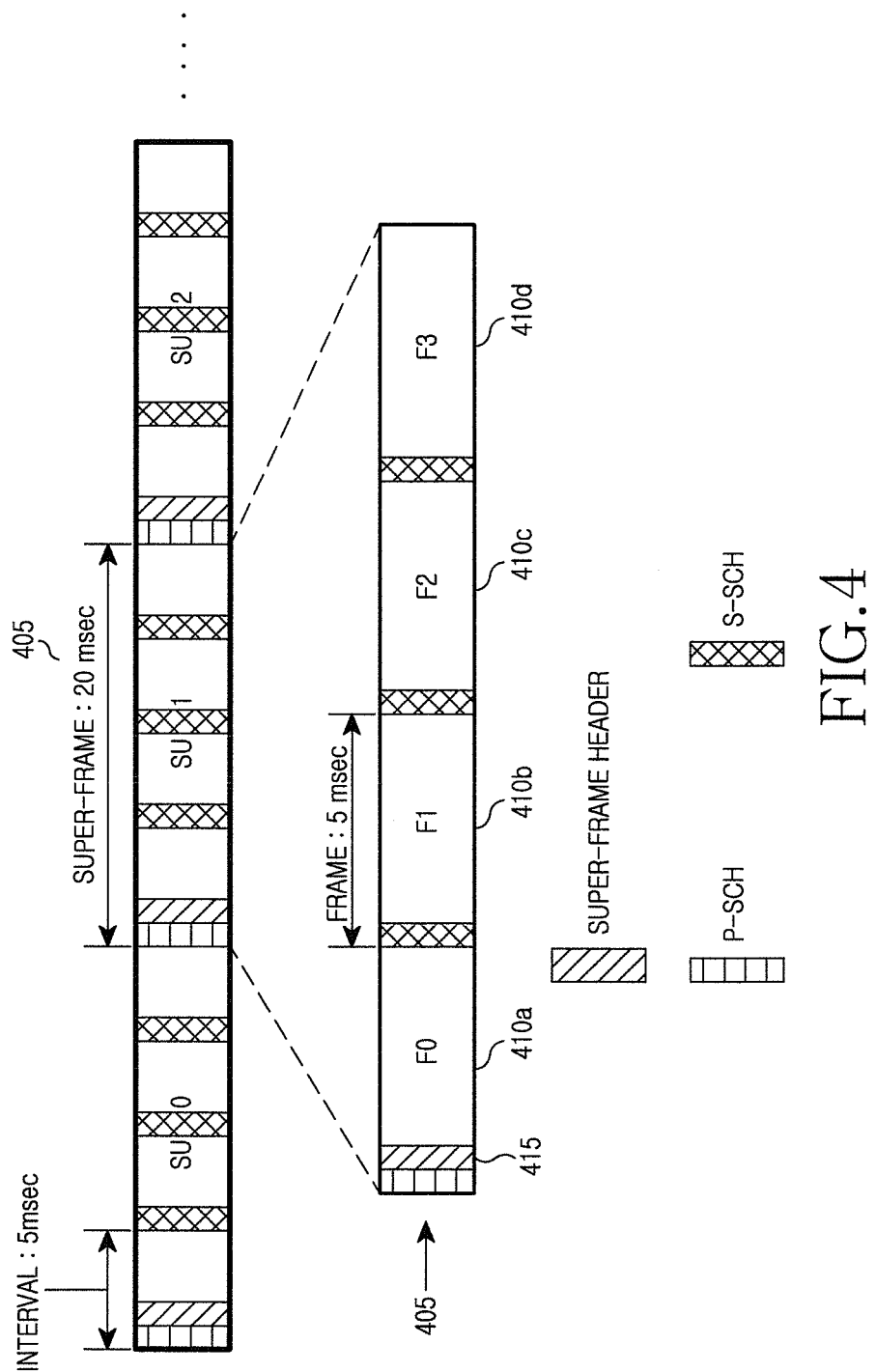
FIG. 4 illustrates positions of a Primary SCH (P-SCH) and a Secondary SCH (S-SCH) in a frame structure according to an exemplary embodiment of the present invention.

FIG. 4 illustrates positions of a P-SCH and an S-SCH in an IEEE 802.16m frame structure according to an exemplary embodiment of the present invention.

In the IEEE 802.16m frame structure of FIG. 4, a super-frame 405 can have a time interval of 20 msec, and include four frames 410a-410d, each having a time interval of 5 msec. FIG. 4 illustrates an example in which one P-SCH symbol and three S-SCH symbols are positioned at intervals of 5 msec within one super-frame 405. The P-SCH symbol can be positioned within a Super-Frame Header (SFH) 415. The P-SCH symbol and the S-SCH symbols can change in number and position depending upon a system standard and a designer's intention. Although the SCH symbol changes in number and position, an exemplary embodiment of the present invention is identically applicable. For example, the P-SCH symbol can be transmitted through a frame (F1) 410*b* next to a frame including the SFH 415, and the S-SCH symbols can be transmitted through frames (F0) 410*a*, (F2) 410*c*, and (F3) 410*d*.

A way to improve timing synchronization of a P-SCH is proposed below. In order to improve the timing synchronization, in an exemplary embodiment of the present invention, subcarriers are spaced one subcarrier interval apart, i.e., a sequence is mapped only to odd-numbered or even-numbered subcarriers at a frequency domain such that a time domain signal has a complete two-time repetition pattern.

Figures 5, 6:
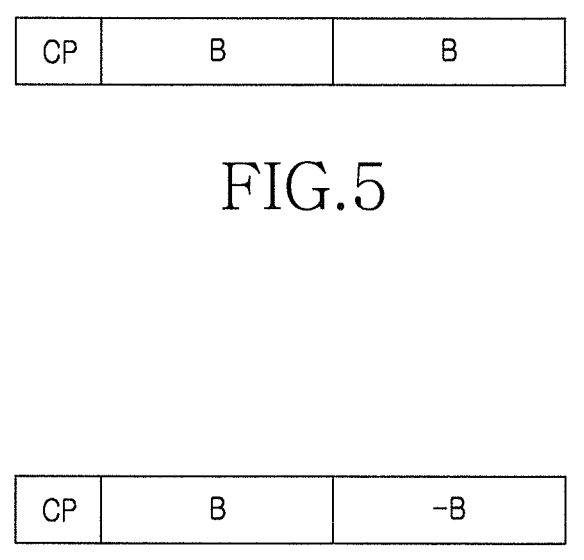

FIG. 5 illustrates a time domain signal when a sequence value is allocated every even-numbered subcarrier at a frequency domain according to an exemplary embodiment of the present invention. As illustrated in FIG. 5, if the sequence value is mapped only to the even-numbered subcarriers at the frequency domain, it is of a form in which the same signal is repeated two times at the time of converting into a time domain signal.

FIG. 6 illustrates a time domain signal when a sequence value is allocated every odd-numbered subcarrier at a frequency domain according to an exemplary embodiment of the present invention. As illustrated in FIG. 6, if the sequence value is mapped only to the odd-numbered subcarriers at the frequency domain, it is of a form in which the same signal is repeated two times at the time of converting into a time domain signal. However, unlike a case of FIG. 5 using the even-numbered subcarriers, one of the repeated signals has a form in which a sign of the other signal is inverted.

Here, because a repetition count '2' is equal to a divisor of the power of '2,' that is a size of Inverse Fast Fourier Transform (IFFT), a two-time repetition pattern of a time domain is shown to be a complete repetition pattern. Thus, if synchronization between BSs is established, a P-SCH of an adjacent cell does not act as interference even at a cell boundary and, instead, a repetition pattern of the P-SCH of the adjacent cell is added, thus providing a macro diversity effect in which a signal magnitude of an SCH increases more than that of other data duration. A case of mapping a sequence only to odd-numbered subcarriers according to an exemplary embodiment of the present invention is described below, for example.

Illustrated herein below is a method for generating a sequence of an SCH according to an exemplary embodiment of the present invention. A length of a sequence for a P-SCH proposed in the present invention is identical irrespective of a size of Fast Fourier Transform (FFT).

Table 1 below is a hexadecimal expression of an example of a sequence for distinguishing a BS type when a P-SCH provides BS type information (indicative of a macro BS, a Femto BS, a relay BS, a hot zone BS, and the like) as supplementary information. For example, a length of each sequence is equal to '216'. A Peak to Average Power Ratio (PAPR) of each sequence is described in the most right column of Table 1 below. Because PAPRs of sequences of Table 1 below are very low, a BS can efficiently boost a transmit power of a P-SCH symbol. Table 1 below shows sequences proposed when the number of P-SCH sequences is equal to '4'. The proposed sequences below were designed considering cross correlation characteristics and PAPRs. Undoubtedly, a corresponding relationship between a BS type and a sequence can change depending on a system standard and a designer's intention.

TABLE 1

| Index | BS type | Sequence | PAPR (dB) |
|---|---|---|---|
| 0 | Macro | B2143168C07B2B21431573F84D4DEBCE973F84DB21431573F84DF3 | 3.82947 |
| 1 | Femto | FC3F30033C30003C0CF333C30056959AA9969AA56959A666965517 | 3.81600 |
| 2 | Relay | 00070B377985B55525E622CD0E03F8F4C8867A4A9525E622CD0EA3 | 3.58150 |
| 3 | Hot zone | FD952E7E74164026AD1818BE9BFD952E718BE9BFD952E718BE9BDC | 3.57615 |

Table 2 below is a hexadecimal expression of an example of a sequence for distinguishing BS type information and FFT size information when a P-SCH provides the BS type information (e.g., a macro BS, a Femto BS, a relay BS, a hot zone BS, and the like) and the FFT size information as supplementary information. For example, a length of each sequence is equal to '216'. A PAPR of each sequence is described in the most right column of Table 2 below. Because PAPRs of sequences of Table 2 below are very low, a BS can efficiently boost a transmit power when transmitting a P-SCH symbol.

TABLE 2

| Index | FFT size | BS type | Sequence | PAPR (dB) |
|---|---|---|---|---|
| 0 | 512 | Macro | B2143168C07B2B21431573F84D4DEBCE973F84DB21431573F84DF3 | 3.82947 |
| 1 |  | Femto | FC3F30033C30003C0CF333C30056959AA9969AA56959A666965517 | 3.81600 |
| 2 |  | Relay | 00070B377985B55525E622CD0E03F8F4C8867A4A9525E622CD0EA3 | 3.58150 |
| 3 |  | Hot zone | FD952E7E74164026AD1818BE9BFD952E718BE9BFD952E718BE9BDC | 3.57615 |
| 4 | 1024 | Macro | 4B9FC26A6F5E74B9FC26A6F5E74B9FC26D90A18B4603D926F5E75D | 3.82612 |
| 5 |  | Femto | E8E8E8971768E8E897689717109710EF10EF6F1090EF10909090A3 | 3.66932 |

TABLE 2-continued

| Index | FFT size | BS type | Sequence | PAPR (dB) |
|---|---|---|---|---|
| 6 | | Relay | E317D37FB2A5CFCE82C87B2A5CFCE82C804D5A31CE82C87B2A5CF6 | 3.82587 |
| 7 | | Hot zone | 642862A6F5E749BD79D26F5E754603D95180F64B9FC26D180F65F2 | 3.77385 |
| 8 | 2048 | Macro | 1EDEDEDEE11EDEE1211EE11EE2DEE2E2DD22DD1D1D22E2DD1D1D4C | 3.71487 |
| 9 | | Femto | ECA973FB2A5CFECA97384D5A31CE82C80C5F4DFCE82C873A0B21B7 | 3.83271 |
| 10 | | Relay | BBB44BBB4B44444B4BB44B4444EEE11EEE1E11E1E1E11EE1EEEEDE | 3.71952 |
| 11 | | Hot zone | 24DEBCEAC87F3AA301EC973D7B2B2143153780C5A301EC973D7B2F | 3.71242 |

Table 3 below is a hexadecimal expression of an example of a sequence for distinguishing BS type information and system BandWidth (BW) size information when a P-SCH provides the BS type information (e.g., a macro BS, a Femto BS, a relay BS, a hot zone BS, and the like) and the system BW size information as supplementary information. For example, a length of each sequence is equal to '216'. A PAPR of each sequence is described in the most right column of Table 3 below. Because PAPRs of sequences of Table 3 below are very low, a BS can efficiently boost a transmit power when transmitting a P-SCH symbol.

Table 4 below is a hexadecimal expression of an example of a sequence for distinguishing BS type information and group information when a P-SCH provides the BS type information (e.g., a macro BS, a Femto BS, a relay BS, a hot zone BS, and the like) and the group information as supplementary information. For example, a length of each sequence is equal to '216'. A PAPR of each sequence is described in the most right column of Table 4 below. Because PAPRs of sequences of Table 4 are very low, a BS can efficiently boost a transmit power when transmitting a P-SCH symbol. For example, the group information can include sector information, segment information, area information, and so forth.

TABLE 3

| Index | SYS. BW (MHz) | BS type | Sequence | PAPR (dB) |
|---|---|---|---|---|
| 0 | 5 | Macro | 32D354CD52D4CB2D354AAAD2B31879FE67F87E6678601FFF87E641 | 3.69878 |
| 1 | | Femto | 25CF5ECA8C07B2A30A1368C07B2A30A13573F84DA30A1368C07B23 | 3.72603 |
| 2 | | Relay | 1978FF1156D0C9978FF76A92F3668700EEA92F31978FF76A92F323 | 3.60357 |
| 3 | | Hot zone | 33F0FFFC030F333F0FF33FCF0C995A5556A9A5966A5AA66A9A59A8 | 3.74849 |
| 4 | 7 | Macro | 316AC87B2FA30316AC87B2FA30316AC804D05CFCE9537FB2FA30A7 | 3.64123 |
| 5 | | Femto | 5461426D18509B461426AE7AF65643F9D26F018B643F9D590FE743 | 3.73158 |
| 6 | | Relay | 4444B44BB4B44444B4BBB44BBB77778778878787887877 78877770 | 3.61817 |
| 7 | | Hot zone | 01C2CDDE616D5AB686774CBC7F01C2CDDE616D55497988B34380EF | 3.71602 |
| 8 | 8.75 | Macro | C94F5117E9F18C94F5088160E6C94F5117E9F1936B0AF77E9F1832 | 3.72732 |
| 9 | | Femto | 31F2FD115E52631F2FDDEA1AD931F2FD115E526CE0D02215E526DC | 3.69522 |
| 10 | | Relay | 78778878888777777788777878D2DD22D2222D2D2222DD222D2D48 | 3.68382 |
| 11 | | Hot zone | AA6966AA65695AA6966659A96AFC3F30CCC3CFFFC3F30033C3005D | 3.73025 |
| 12 | 10 | Macro | B8889708EF0F17176968916F1112223DA245A5BDBDC3C23BC5BBBD | 3.71487 |
| 13 | | Femto | CE82C80C5AB20317D37F3A54DE317D378C5AB20317D378C5A82123 | 3.68974 |
| 14 | | Relay | E7416439D2A6FE74164062D590E7416439D2A6F18BE9BF9D2A6F5E | 3.52423 |
| 15 | | Hot zone | 2B4ACD3334B2AAB4ACD54CB4D501E067999E1807E1F98019E180FF | 3.65289 |
| 16 | 20 | Macro | 616D511FE3D32616D52201C2CE616D511FE3D319E92ADDFE3D32DC | 3.73097 |
| 17 | | Femto | AACB4CAACD4B52ACB4CCD32B4A8061E60067E1FFF9E199867E1F83 | 3.65640 |
| 18 | | Relay | A301EC973D7B2A301ECA8C284DA301EC973D7B25CFE13573D7B21A | 3.73754 |
| 19 | | Hot zone | 590A18AB9FC26A6F5E74B9FC26D90A18AB9FC26D90A18B4603D967 | 3.71994 |

TABLE 4

| Index | Group info. | BS type | Sequence | PAPR (dB) |
|---|---|---|---|---|
| 0 | Group 0 | Macro | B2143168C07B2B21431573F84D4DEBCE973F84DB21431573F84DF3 | 3.82947 |
| 1 | | Femto | FC3F30033C30003C0CF333C30056959AA9969AA56959A666965517 | 3.81600 |
| 2 | | Relay | 00070B377985B55525E622CD0E03F8F4C8867A4A9525E622CD0EA3 | 3.58150 |
| 3 | | Hot zone | FD952E7E74164026AD1818BE9BFD952E718BE9BFD952E718BE9BDC | 3.57615 |
| 4 | Group 1 | Macro | 4B9FC26A6F5E74B9FC26A6F5E74B9FC26D90A18B4603D926F5E75D | 3.82612 |
| 5 | | Femto | E8E8E8971768E8E897689717109710EF10EF6F1090EF10909090A3 | 3.66932 |
| 6 | | Relay | E317D37FB2A5CFCE82C87B2A5CFCE82C804D5A310E82C87B2A5CF6 | 3.82587 |
| 7 | | Hot zone | 642862A6F5E749BD79D26F5E754603D95180F64B9FC26D180F65F2 | 3.77385 |
| 8 | Group 2 | Macro | 1EDEDEDEE11EDEE1211EE11EE2DEE2E2DD22DD1D1D22E2DD1D1D4C | 3.71487 |
| 9 | | Femto | ECA973FB2A5CFECA97384D5A31CE82C80C5F4DFCE82C873A0B21B7 | 3.83271 |
| 10 | | Relay | BBB44BBB4B44444B4BB44B4444BEE11EEE1E11E1E1E11EE1EEEEDE | 3.71952 |
| 11 | | Hot zone | 24DEBCEAC87F3AA301EC973D7B2B2143153780C5A301EC973D7B2F | 3.71242 |

Table 5 below is a hexadecimal expression of an example of a sequence used to distinguish a combination of respective information when a P-SCH provides, as supplementary information, BS type information (e.g., a macro BS, an Open Subscriber Group (OSG) Femto BS, a Closed Subscriber Group (CSG) Femto BS, a relay BS, a hot zone BS, and the like), system BW size information or FFT size information, sector information (or segment information), carrier type information (e.g., a full configured carrier, a partially configured carrier, and the like), and so forth. For example, a length of each sequence is equal to '216'. The BS type can be a BS (e.g., a macro BS) included in a neighbor BS list (NBR_ADV), a BS (e.g., a Femto BS) not included in the neighbor BS list (NBR_ADV), and so forth. A PAPR of each sequence is described in the most right column of Table 5 below. Because PAPRs of sequences of Table 5 are very low, a BS can efficiently boost a transmit power when transmitting a P-SCH symbol.

TABLE 5

| Index | Sequence | PAPR (dB) |
|---|---|---|
| 0 | 6DB4F3B16BCE59166C9CEF7C3C8CA5EDFC16A9D1DC01F2AE6AA08F | 4.09203 |
| 1 | 1799628F3B9F8F3B22C1BA19EAF94FEC4D37DEE97E027750D298AC | 4.03218 |
| 2 | F72E132A8A9F4235B2D7F88F0F3652F264493E5F6D8B9E318C1791 | 4.12560 |
| 3 | 92161C7C19BB2FC0ADE5CEF3543AC1B6CE6BE1C8DCABDDD319EAF7 | 3.93829 |
| 4 | 4E3B0356A0D5DB7C1E779A3F18FB9B2D7E3632C5FE4AAFB3C91484 | 4.13627 |
| 5 | 6DE116E665C395ADC70A89716908620868A60340BF35ED547F8281 | 3.91492 |
| 6 | BCFDF60DFAD6B027E4C39DB20D783C9F467155179CBA31115E2D04 | 4.02384 |
| 7 | 7EF1379553F9641EE6ECDBF5F144287E329606C616292A3C77F928 | 4.11870 |
| 8 | 8E2D572ED808868511DB911D1F22E08FFCFAB18DEF892ECCE7AAD2 | 4.14038 |
| 9 | 8A9CA262B8B3D37E3158A3B17BFA4C9FCFF4D396D2A93DE65A0E7C | 4.06707 |
| 10 | 89759434E57B6C8B05573B1567F356F3EE0EF8FB40E6C845A1F37F | 4.13956 |
| 11 | DA8CE648727E4282780384AB53CEEBD1CBF79E0C5DA7BA85DD3749 | 4.05928 |
| 12 | 3A65D1E6042E8B8AADC701E210B5B4B650B6AB31F7A918893FB04A | 3.99307 |
| 13 | 9F2CB771C62E459FF0F1CAD0F657C51104850A53F02777AA810697 | 4.13124 |
| 14 | D46CF86FE51B56B2CAA84F26F6F204428C1BD23F3D888737A0851C | 4.08846 |
| 15 | 640267A0C0DF11E475066F1610954B5AE55E189EA7E72EFD57240F | 4.02380 |

Table 6 below is one exemplary implementation of representing supplementary information corresponding to the sequences of Table 5.

TABLE 6

| Index | Carrier | BS type | SYS. BW (MHz) |
|---|---|---|---|
| 0 | Fully configured | Macro | 5 |
| 1 | | | 10 |
| 2 | | | 20 |
| 3 | | | reserved |
| 4 | | | reserved |
| 5 | | OSG Femto/Hot zone | 5 |
| 6 | | | 10 |
| 7 | | | 20 |
| 8 | | | reserved |
| 9 | | | reserved |
| 10 | | CSG Femto | 5 |
| 11 | | | 10 |
| 12 | | | 20 |
| 13 | | | reserved |
| 14 | | | reserved |
| 15 | Partially configured | | |

Table 7 below is one exemplary implementation of representing supplementary information corresponding to the partial sequences of Table 5.

TABLE 7

| Index | Carrier | BS type | SYS. BW (MHz) |
|---|---|---|---|
| 0 | Fully configured | BS included in NBR_ADV | 5 |
| 1 | | | 10 |
| 2 | | | 20 |
| 3 | | | reserved |
| 4 | | | reserved |
| 5 | | BS not included in NBR_ADV | 5 |
| 6 | | | 10 |
| 7 | | | 20 |
| 8 | | | reserved |

TABLE 7-continued

| Index | Carrier | BS type | SYS. BW (MHz) |
|---|---|---|---|
| 9 | | | reserved |
| 10 | | Partially configured | |

Table 8 below is one exemplary implementation of representing supplementary information corresponding to the sequences of Table 5.

TABLE 8

| Index | Carrier | Sector ID (or segment ID) | SYS. BW (MHz) |
|---|---|---|---|
| 0 | Fully configured | 0 | 5 |
| 1 | | | 10 |
| 2 | | | 20 |
| 3 | | | reserved |
| 4 | | | reserved |
| 5 | | 1 | 5 |
| 6 | | | 10 |
| 7 | | | 20 |
| 8 | | | reserved |
| 9 | | | reserved |
| 10 | | 2 | 5 |
| 11 | | | 10 |
| 12 | | | 20 |
| 13 | | | reserved |
| 14 | | | reserved |
| 15 | Partially configured | | |

In Tables 6, 7, and 8, the 'Fully configured' and the 'Partially configured' are of carrier types, and represent configurations of control channels in the case of performing multi-carrier transmission. The 'Fully configured' denotes a carrier for which all control channels including synchronization, broadcast, multicast and unicast control signaling are configured. Further, information and parameters regarding multi-carrier operation and the other carriers can also be included in the control channels. The 'Partially configured' denotes a carrier with only downlink transmission in Time Division Duplex (TDD) or a downlink carrier without paired uplink carrier in a Frequency Division Duplex (FDD) mode and configured with all control channels to support downlink transmission.

Tables 6, 7, and 8 are exemplary implementations of transmitting supplementary information using the sequences of Table 5, and do not limit the scope of the present invention. Besides Tables 6, 7, and 8, a variety of supplementary information transmission methods using the sequences of Table 5 are possible. For example, in Tables 6, 7, and 8, the system BW size information can be substituted with FFT size information. Also, a corresponding relationship between an index number and a sequence can be varied, or only a sub-set of the sequences of Table 5 can be used.

An exemplary embodiment of the present invention proposes a method for mapping the P-SCH sequence to subcarriers. When a subcarrier index '256' is allocated to a Direct Current (DC) subcarrier, a subcarrier set for the P-SCH is expressed as in Equation 1:

$$PSCHCarrierSet = 2 \cdot K + 41 \quad [\text{Eqn. 1}]$$

In Equation 1, the 'PSCHCarrierSet' represents indexes of subcarriers allocated for a P-SCH, and the 'k' is an integer of '0' to '215'.

Figure 7:
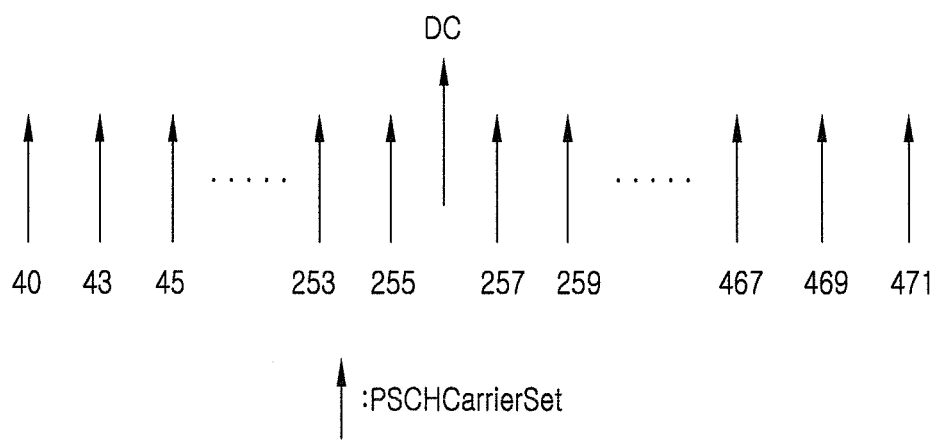
FIG. 7 illustrates a subcarrier set of a P-SCH according to an exemplary embodiment of the present invention.

FIG. 7 illustrates a subcarrier set in which a P-SCH is mapped according to an exemplary embodiment of the present invention. As illustrated in FIG. 7, the subcarrier set (PSCHCarrierSet) in which the P-SCH is mapped is constituted of subcarriers of indexes '41', '43', '45', . . . , '469', and '471' according to Equation 1. That is, the P-SCH sequence is mapped to subcarriers of odd-numbered indexes among the subcarriers of the indexes '41' to '471', and no sequence is mapped to subcarriers out of a range of the indexes '41' to '471'. In other words, irrespective of the number of subcarriers, the P-SCH sequence is mapped only to 216 subcarriers centering on a DC subcarrier.

Sequences generated using Tables 1 to 4 are modulated into a power-boosted Binary Phase Shift Keying (BPSK) signal, and are sequentially mapped to the subcarriers of FIG. 7.

Operations and constructions of a transmit end for transmitting a synchronization signal and a receive end as described above according to an exemplary embodiment of the present invention are described with reference to the accompanying drawings.

Figure 8:
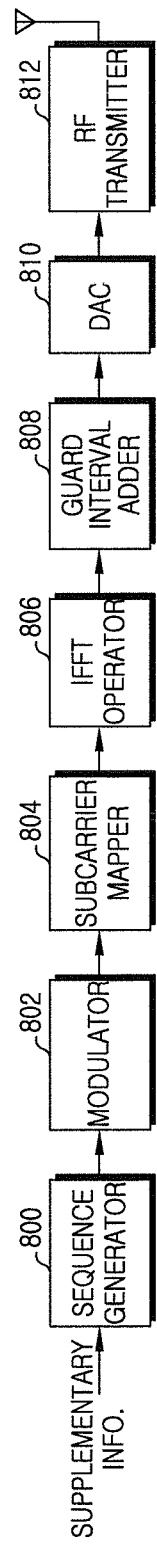
FIG. 8 illustrates a construction of an SCH transmit end in a broadband wireless communication system according to an exemplary embodiment of the present invention.

FIG. 8 illustrates a construction of an SCH transmit end in a broadband wireless communication system according to an exemplary embodiment of the present invention.

As illustrated in FIG. 8, the SCH transmit end includes a sequence generator 800, a modulator 802, a subcarrier mapper 804, an IFFT operator 806, a guard interval adder 808, a Digital to Analog Converter (DAC) 810, and a Radio Frequency (RF) transmitter 812.

The sequence generator 800 generates a sequence according to supplementary information from an upper controller (not shown). For example, the sequence generator 800 can store Table such as Table 1, 2, 3, or 4, acquire a sequence according to input supplementary information from stored Table, and output the sequence. In another example, the sequence generator 800 can store only a sequence according to supplementary information corresponding to the transmit end, and output the stored sequence under control of the upper controller.

The modulator 802 modulates the sequence provided from the sequence generator 800 according to a determined modulation scheme. For example, the modulator 802 modulates the sequence into a power-boosted BPSK signal.

The subcarrier mapper 804 maps the sequence modulated by the modulator 802 to subcarriers included in a subcarrier set (PSCHCarrierSet). At this time, the sequence can be mapped to odd-numbered or even-numbered subcarriers for the sake of a two-time repetition pattern at a time domain. For example, the subcarrier set (PSCHCarrierSet) can be configured as in FIG. 7.

The IFFT operator 806 generates time domain sample data by IFFT-operating a signal mapped to subcarriers by the subcarrier mapper 804. The guard interval adder 808 adds a guard interval (e.g., a Cyclic Prefix (CP)) to the sample data from the IFFT operator 806 and generates a P-SCH signal (or a P-SCH symbol).

The DAC 810 converts the P-SCH symbol (i.e., OFDMA symbol) from the guard interval adder 810 into an analog signal. The RF transmitter 812 up-converts the baseband analog signal from the DAC 810 into an RF signal and then, transmits the RF signal through an antenna.

Assuming that the transmit end is equal to a BS and a receive end receiving an SCH is equal to an MS, the MS acquires timing synchronization using a P-SCH signal received from the BS, and extracts supplementary information. At this time, the MS acquires timing synchronization using a two-time repetition pattern at a time domain of a P-SCH, and acquires supplementary information through sequence detection at a frequency domain. The supplementary information can include at least one of BS type information, an FFT size, a system BW size, a carrier type, and other system parameters.

Figure 9:
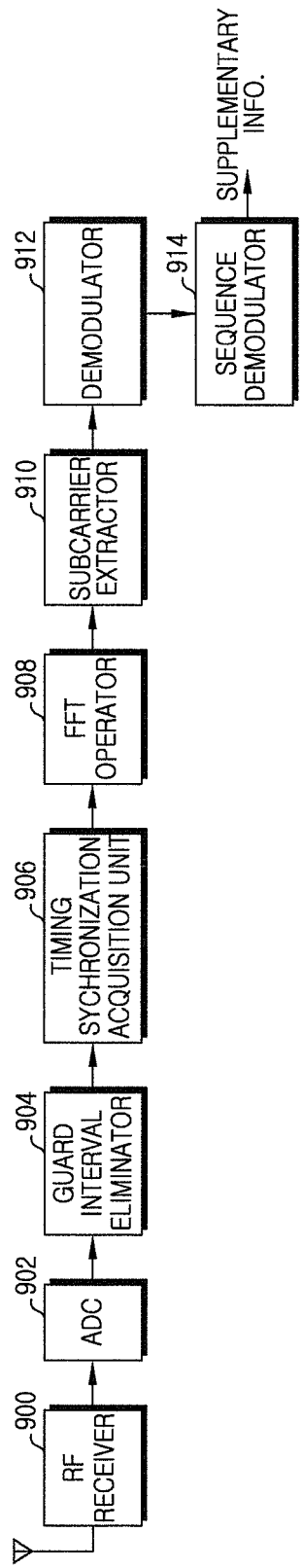
FIG. 9 illustrates a construction of an SCH receive end in a broadband wireless communication system according to an exemplary embodiment of the present invention.

FIG. 9 illustrates a construction of an SCH receive end in a broadband wireless communication system according to an exemplary embodiment of the present invention.

As illustrated in FIG. 9, the SCH receive end includes an RF receiver 900, an Analog to Digital Converter (ADC) 902, a guard interval eliminator 904, a timing synchronization acquisition unit 906, an EFT operator 908, a subcarrier extractor 910, a demodulator 912, and a sequence demodulator 914.

The RF receiver 900 down-converts an RF band signal received through an antenna into a baseband analog signal. The ADC 902 samples the baseband analog signal and converts the sampled analog signal into a digital signal. The guard interval eliminator 904 acquires OFDMA symbol synchronization from the sample data from the ADC 902, and eliminates a guard interval (e.g., a CP) on the basis of the OFDMA symbol synchronization.

The timing synchronization acquisition unit 906 acquires timing synchronization (i.e., frame synchronization, super-frame synchronization, and the like) by repeatedly performing a correlation operation for the sample data from the guard interval eliminator 904 in a sliding window manner, and provides the acquired timing synchronization to an upper controller. Namely, because a P-SCH signal for timing synchronization is repeated two times at a time domain, the timing synchronization acquisition unit 906 determines a position of the two-time repeated signal through the correlation operation. And, the timing synchronization acquisition unit 906 outputs the sample data on a per-OFDMA-symbol basis. Here, it is described that the timing synchronization (i.e., the frame synchronization, the super-frame synchronization, and the like) is acquired at the time domain, but the timing synchronization acquisition can be also achieved even at a frequency domain.

The FFT operator 908 generates frequency domain data by FFT-operating sample data provided from the timing synchronization acquisition unit 906. The subcarrier extractor 910 extracts signals (i.e., subcarrier values) of a subcarrier set of a P-SCH among the frequency domain data from the FFT operator 908.

The demodulator 912 demodulates the extracted signals in a demodulation scheme corresponding to a modulation scheme (e.g., BPSK) used in the modulator 902 of the transmit end. The sequence demodulator 914 stores the same Table as Table stored in the sequence generator 800 of the transmit end, determines correlation values between a received sequence and all sequences of Table, and outputs supplementary information corresponding to a sequence having the maximum correlation value. For example, the supplementary information can include at least one of BS type information, an FFT size, a BW size, a carrier type, and other system parameters.

Figure 10:
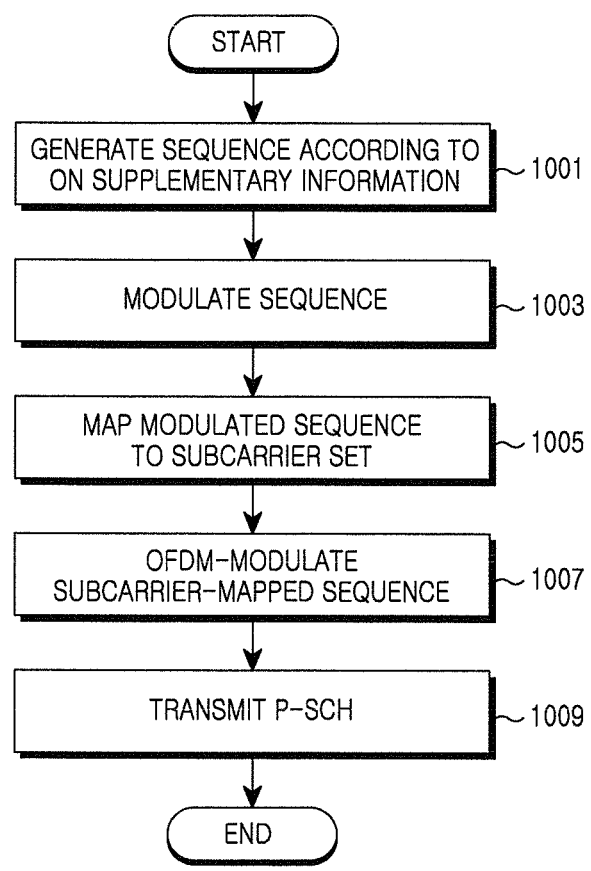
FIG. 10 illustrates a procedure for transmitting an SCH in a broadband wireless communication system according to an exemplary embodiment of the present invention.

FIG. 10 illustrates a procedure for transmitting a P-SCH in a broadband wireless communication system according to an exemplary embodiment of the present invention.

Referring to FIG. 10, in step 1001, a transmit end (i.e., a BS) generates a sequence according to supplementary information. Here, the supplementary information is a broadcasted system parameter, and can include, for example, at least one of BS type information (e.g., a macro BS, a Femto BS, a relay BS, a hot zone BS, and the like), an FFT size, a BW size, a carrier type, and other system parameters. In an exemplary embodiment of the present invention, it is assumed to generate a sequence based on Tables 1 to 4.

Then, in step 1003, the transmit end modulates the sequence according to a determined modulation scheme. For example, the transmit end can modulate the sequence into a power-boosted BPSK signal.

Then, in step 1005, the transmit end maps the modulated sequence to subcarriers of a subcarrier set (PSCHCarrierSet) of a P-SCH. At this time, the sequence can be mapped to odd-numbered or even-numbered subcarriers for the sake of a two-time repetition pattern at a time domain. For example, the subcarrier set (PSCHCarrierSet) can be configured as in FIG. 7.

Then, in step 1007, the transmit end OFDM-modulates the subcarrier-mapped sequence and generates a P-SCH signal (i.e., a P-SCH symbol). Additionally, in step 1009, the transmit end RF-processes the generated P-SCH signal and transmits the P-SCH signal to an MS.

Figure 11:
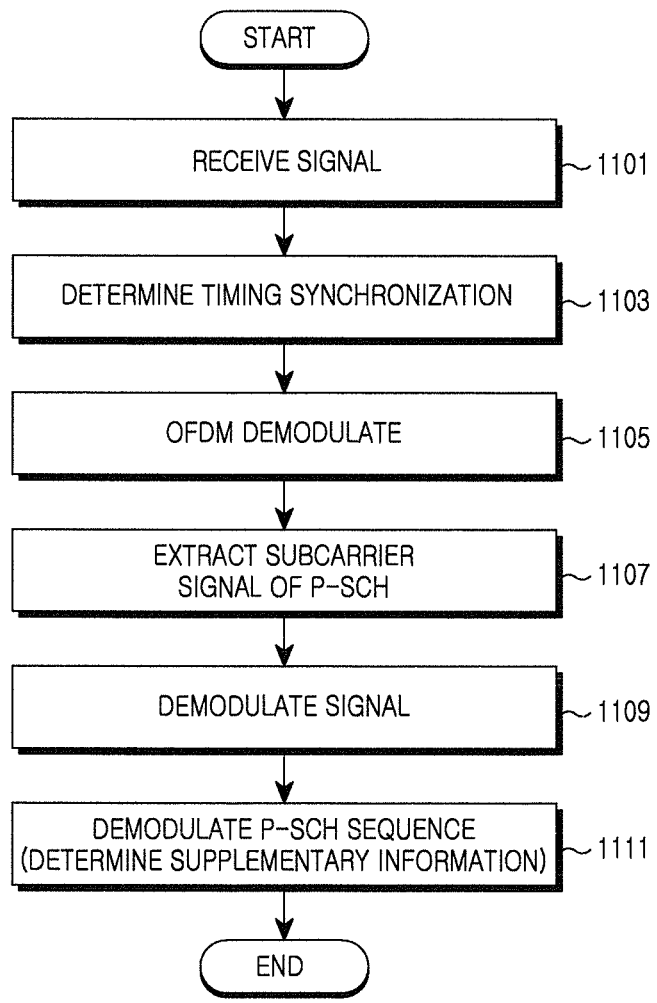
FIG. 11 illustrates a procedure for receiving an SCH in a broadband wireless communication system according to an exemplary embodiment of the present invention.

FIG. 11 illustrates a procedure for receiving a P-SCH in a broadband wireless communication system according to an exemplary embodiment of the present invention.

Referring to FIG. 11, in step 1101, a receive end (i.e., an MS) converts an RF band signal received from a BS into baseband sample data. Thereafter, in step 1103, the receive end determines timing synchronization (i.e., frame synchronization, super-frame synchronization, and the like) by performing a correlation operation for the sample data in a sliding window manner. Additionally, in step 1105, the receive end OFDM-demodulates the received sample data on the basis of the acquired timing synchronization and generates frequency domain data.

Then, in step 1107, the receive end extracts signals of a subcarrier set of a P-SCH among the frequency domain data. Additionally, in step 1109, the receive end demodulates the extracted subcarrier signals in a demodulation scheme corresponding to a modulation scheme (e.g., BPSK) of a transmit end and acquires a P-SCH sequence.

And, in step 1111, the receive end determines correlation values between the acquired P-SCH sequence and all sequences within stored Table, and determines supplementary information corresponding to a sequence having the maximum correlation value. For example, the supplementary information can include at least one of BS type information, an FFT size, a BW size, a carrier type, and other system parameters.

As described above, an exemplary embodiment of the present invention proposes a P-SCH making timing synchronization and supplementary information transmission possible in a wireless communication system. Because subcarriers constituting a P-SCH according to the present invention are spaced one subcarrier interval apart, thereby maintaining a two-time repetition pattern at a time domain, there is an advantage of improving timing synchronization performance at a cell boundary. Also, there is an advantage of being capable of greatly reducing a complexity (e.g., a signaling complexity, and the like) necessary for network entry, handover, so forth by transmitting supplementary information such as a BS type, etc. through an SCH.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for use in a base station in a wireless communication system, the apparatus comprising:

a modulator configured to modulate a preamble sequence that is determined based on a carrier configuration and a bandwidth;

a subcarrier mapper configured to map the modulated preamble sequence to subcarriers within a predefined subcarrier set that is determined by a predefined rule; and a transmitter configured to transmit the preamble sequence, wherein the carrier configuration is one of a configuration for a fully configured carrier and a configuration for a partially configured carrier, wherein control channels including synchronization, broadcast, multicast and unicast control signaling are configured for the fully configured carrier, and wherein a downlink only carrier with control channels to support downlink transmission is configured for the partially configured carrier.

2. The apparatus of claim 1, wherein a length of the preamble sequence is equal to '216'.

3. The apparatus of claim 2, wherein the subcarriers in the predefined subcarrier set are spaced one subcarrier interval apart.

4. The apparatus of claim 1, wherein the subcarrier set (PSCHCarrierSet) is configured according to the equation:

$$PSCHCarrierSet = 2 \cdot k + 41,$$

where PSCHCarrierSet corresponds to indexes of subcarriers allocated for the preamble and k corresponds to an integer between 0 and 215 inclusive, and wherein an index value=256 corresponds to a Direct Current (DC) subcarrier.

5. The apparatus of claim 1, wherein candidates for the preamble sequence are determined according to a first table, the first table comprising:

| Index | Sequence (hexadecimal) |
| --- | --- |
| 0 | 6DB4F3B16BCE59166C9CEF7C3C8CA5EDFC16A9D1DC01F2AE6AA08F |
| 1 | 1799628F3B9F8F3B22C1BA19EAF94FEC4D37DEE97E027750D298AC |
| 2 | 92161C7C19BB2FC0ADE5CEF3543AC1B6CE6BE1C8DCABDDD319EAF7 |
| 3 | 6DE116E665C395ADC70A89716908620868A60340BF35ED547F8281 |
| 4 | BCFDF60DFAD6B027E4C39DB20D783C9F467155179CBA31115E2D04 |
| 5 | 7EF1379553F9641EE6ECDBF5F144287E329606C616292A3C77F928 |
| 6 | 8A9CA262B8B3D37E3158A3B17BFA4C9FCFF4D396D2A93DE65A0E7C |
| 7 | DA8CE648727E4282780384AB53CEEBD1CBF79E0C5DA7BA85DD3749 |
| 8 | 3A65D1E6042E8B8AADC701E210B5B4B650B6AB31F7A918893FB04A |
| 9 | D46CF86FE51B56B2CAA84F26F6F204428C1BD23F3D888737A0851C |
| 10 | 640267A0C0DF11E475066F1610954B5AE55E189EA7E72EFD57240F. |

6. The apparatus of claim 5, wherein a corresponding relationship between a combination of bandwidth (BW) and carrier type and the candidates for the preamble sequence is as indicated in a second table, the second table comprising:

| Index | Carrier | BW | Sequence |
| --- | --- | --- | --- |
| 0 | Fully configured | 5 MHz | 6DB4F3B16BCE59166C9CEF7C3C8CA5EDFC16A9D1DC01F2AE6AA08F |
| 1 | | 7, 8.75 & 10 MHz | 1799628F3B9F8F3B22C1BA19EAF94FEC4D37DEE97E027750D298AC |
| 2 | | 20 MHz | 92161C7C19BB2FC0ADE5CEF3543AC1B6CE6BE1C8DCABDDD319EAF7 |
| 3 | | — | 6DE116E665C395ADC70A89716908620868A60340BF35ED547F8281 |
| 4 | | — | BCFDF60DFAD6B027E4C39DB20D783C9F467155179CBA31115E2D04 |
| 5 | | — | 7EF1379553F9641EE6ECDBF5F144287E329606C616292A3C77F928 |
| 6 | | — | 8A9CA262B8B3D37E3158A3B17BFA4C9FCFF4D396D2A93DE65A0E7C |
| 7 | | — | DA8CE648727E4282780384AB53CEEBD1CBF79E0C5DA7BA85DD3749 |
| 8 | | — | 3A65D1E6042E8B8AADC701E210B5B4B650B6AB31F7A918893FB04A |
| 9 | | — | D46CF86FE51B56B2CAA84F26F6F204428C1BD23F3D888737A0851C |
| 10 | Partially configured | N/A | 640267A0C0DF11E475066F1610954B5AE55E189EA7E72EFD57240F. |

7. The apparatus of claim 6, further comprising:

an Orthogonal Frequency Division Multiplexing (OFDM) modulator configured to generate a preamble symbol by OFDM-modulating the preamble sequence mapped to the subcarriers, wherein the preamble symbol has a pattern where a same signal is repeated twice.

8. The apparatus of claim 1, wherein the predefined subcarrier set consists of subcarriers having odd-numbered indexes between '41' and '471' inclusive.

9. A method for transmitting a preamble in a wireless communication system, the method comprising:

modulating a preamble sequence that is determined based on a carrier configuration and a bandwidth;

mapping the modulated preamble sequence to subcarriers in a predefined subcarrier set that is determined by a predefined rule; and transmitting the preamble symbol, wherein the carrier configuration is one of a configuration for a fully configured carrier and a configuration for a partially configured carrier, wherein control channels including synchronization, broadcast, multicast and unicast control signaling are configured for the fully configured carrier, and wherein a downlink only carrier configured with control channels to support downlink transmission is configured for the partially configured carrier.

10. The method of claim 9, wherein a length of the preamble sequence is equal to '216'.

11. The method of claim 10, wherein the subcarriers in the predefined subcarrier set are spaced one subcarrier interval apart.

12. The method of claim 9, wherein the subcarrier set (PSCHCarrierSet) is configured according to the equation:

PSCHCarrierSet=2·$k$+41, where PSCHCarrierSet corresponds to indexes of subcarriers allocated for the preamble and k corresponds to an integer between 0 and 215 inclusive, and wherein an index value=256 corresponds to a Direct Current (DC) subcarrier.

13. The method of claim 9, wherein candidates for the preamble sequence are determined according to a first table, the first table comprising:

| Index | Sequence (hexadecimal) |
| --- | --- |
| 0 | 6DB4F3B16BCE59166C9CEF7C3C8CA5EDFC16A9D1DC01F2AE6AA08F |
| 1 | 1799628F3B9F8F3B22C1BA19EAF94FEC4D37DEE97E027750D298AC |
| 2 | 92161C7C19BB2FC0ADE5CEF3543AC1B6CE6BE1C8DCABDDD319EAF7 |
| 3 | 6DE116E665C395ADC70A89716908620868A60340BF35ED547F8281 |
| 4 | BCFDF60DFAD6B027E4C39DB20D783C9F467155179CBA31115E2D04 |
| 5 | 7EF1379553F9641EE6ECDBF5F144287E329606C616292A3C77F928 |
| 6 | 8A9CA262B8B3D37E3158A3B17BFA4C9FCFF4D396D2A93DE65A0E7C |
| 7 | DA8CE648727E4282780384AB53CEEBD1CBF79E0C5DA7BA85DD3749 |
| 8 | 3A65D1E6042E8B8AADC701E210B5B4B650B6AB31F7A918893FB04A |
| 9 | D46CF86FE51B56B2CAA84F26F6F204428C1BD23F3D888737A0851C |
| 10 | 640267A0C0DF11E475066F1610954B5AE55E189EA7E72EFD57240F. |

14. The method of claim 13, wherein a corresponding relationship between the combination of the BW and the carrier type and the candidates for the preamble sequence is as indicated in a second table, the second table comprising:

| Index | Carrier | BW | Sequence |
| --- | --- | --- | --- |
| 0 | Fully | 5 MHz | 6DB4F3B16BCE59166C9CEF7C3C8CA5EDFC16A9D1DC01F2AE6AA08F |
| 1 | configured | 7, 8.75 & 10 MHz | 1799628F3B9F8F3B22C1BA19EAF94FEC4D37DEE97E027750D298AC |
| 2 | | 20 MHz | 92161C7C19BB2FC0ADE5CEF3543AC1B6CE6BE1C8DCABDDD319EAF7 |
| 3 | | — | 6DE116E665C395ADC70A89716908620868A60340BF35ED547F8281 |
| 4 | | — | BCFDF60DFAD6B027E4C39DB20D783C9F467155179CBA31115E2D04 |
| 5 | | — | 7EF1379553F9641EE6ECDBF5F144287E329606C616292A3C77F928 |
| 6 | | — | 8A9CA262B8B3D37E3158A3B17BFA4C9FCFF4D396D2A93DE65A0E7C |
| 7 | | — | DA8CE648727E4282780384AB53CEEBD1CBF79E0C5DA7BA85DD3749 |
| 8 | | — | 3A65D1E6042E8B8AADC701E210B5B4B650B6AB31F7A918893FB04A |
| 9 | | — | D46CF86FE51B56B2CAA84F26F6F204428C1BD23F3D888737A0851C |
| 10 | Partially configured | N/A | 640267A0C0DF11E475066F1610954B5AE55E189EA7E72EFD57240F. |

15. The method of claim 14, further comprising:
generating a preamble symbol by OFDM-modulating the preamble sequence mapped to the subcarriers,
wherein the preamble symbol has a pattern where a same signal is repeated twice.

16. The base station of claim 15, wherein the subcarrier set (PSCHCarrierSet) is configured according to the equation:

$$PSCHCarrierSet = 2 \cdot k + 41,$$

where PSCHCarrierSet corresponds to indexes of subcarriers allocated for the preamble and k corresponds to an integer between 0 and 215 inclusive, and
wherein an index value=256 corresponds to a Direct Current (DC) subcarrier.

17. The method of claim 9, wherein the predefined subcarrier set consists of subcarriers having odd-numbered indexes between '41' and '471' inclusive.

18. A base station in a wireless communication system, the base station comprising:
a modulator configured to modulate a preamble sequence that is determined based on a carrier configuration and a bandwidth;
a subcarrier mapper configured to map the modulated preamble sequence to subcarriers in a predefined subcarrier set, the predefined subcarrier set consisting of subcarriers having odd-numbered indexes between '41' and '471' inclusive; and
a transmitter coupled to at least one antenna, the transmitter configured to transmit the preamble sequence using the at least one antenna, wherein the carrier configuration is one of a configuration for a fully configured carrier and a configuration for a partially configured carrier,
wherein control channels including synchronization, broadcast, multicast and unicast control signaling are configured for the fully configured carrier, and
wherein a downlink only carrier with control channels to support downlink transmission is configured for the partially configured carrier.

19. The base station of claim 18, wherein a length of the preamble sequence is equal to '216'.

20. The base station of claim 19, wherein the subcarriers in the predefined subcarrier set are spaced one subcarrier interval apart.

21. An apparatus for use in a mobile station in a wireless communication system, the apparatus comprising:
a receiver configured to receive, from a base station, a preamble sequence that is determined based on a carrier configuration and a bandwidth; and
a demodulator configured to demodulate the preamble sequence,
wherein the carrier configuration is one of a configuration for a fully configured carrier and a configuration for a partially configured carrier,
wherein control channels including synchronization, broadcast, multicast and unicast control signaling are configured for the fully configured carrier, and
wherein a downlink only carrier with control channels to support downlink transmission is configured for the partially configured carrier.

22. A method for operating a mobile station in a wireless communication system, the method comprising:
receiving, from a base station, a preamble sequence that is determined based on a carrier configuration and a bandwidth; and
demodulating the preamble sequence,
wherein the carrier configuration is one of a configuration for a fully configured carrier and a configuration for a partially configured carrier,
wherein control channels including synchronization, broadcast, multicast and unicast control signaling are configured for the fully configured carrier, and
wherein a downlink only carrier with control channels to support downlink transmission is configured for the partially configured carrier.

* * * * *